US012683670B2

(12) United States Patent
Ling et al.

(10) Patent No.: US 12,683,670 B2
(45) Date of Patent: Jul. 14, 2026

(54) METHOD AND APPARATUS FOR UPLINK TRANSMISSION

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 345 days.

(21) Appl. No.: 18/261,031

(22) PCT Filed: Jan. 11, 2021

(86) PCT No.: PCT/CN2021/071054
§ 371 (c)(1),
(2) Date: Jul. 11, 2023

(87) PCT Pub. No.: WO2022/147826
PCT Pub. Date: Jul. 14, 2022

(65) Prior Publication Data
US 2024/0063880 A1      Feb. 22, 2024

(51) Int. Cl.
*H04L 5/00* (2006.01)
*H04B 7/06* (2006.01)
(52) U.S. Cl.
CPC ....... *H04B 7/06952* (2023.05); *H04L 5/0053* (2013.01)
(58) Field of Classification Search
CPC ..... H04B 7/06952; H04L 5/0053; H04L 1/08; H04L 5/0023
See application file for complete search history.

(56) References Cited

U.S. PATENT DOCUMENTS

2023/0029850 A1* 2/2023 Park ...................... H04L 1/1861
2023/0136113 A1* 5/2023 Guo ...................... H04L 5/0094
370/329
(Continued)

FOREIGN PATENT DOCUMENTS

CN 111971925 A 11/2020
WO 2015013993 A1 2/2015
(Continued)

OTHER PUBLICATIONS

3GPP TSG RAN WG1 Meeting #97, R1-1906567 Title: On repet schemes for NR PUSCH (Year: 2019).*
(Continued)

*Primary Examiner* — Faruk Hamza
*Assistant Examiner* — Abusayeed M Haque
(74) *Attorney, Agent, or Firm* — Kunzler Needham & Hilton

(57) ABSTRACT

Embodiments of the present application are related to a method and apparatus for uplink transmission. An exemplary method of the present application includes: receiving a downlink control information (DCI) indicating a set of common transmission configuration indication (TCI) states for uplink transmission; and in response to the set of common TCI states being applicable for the uplink transmission, transmitting uplink transmission with repetition according to at least part of the set of common TCI states; or transmitting uplink transmission without repetition according to one of the set of common TCI states or an additional TCI state instead of the set of common TCI states.

17 Claims, 5 Drawing Sheets

(56)     References Cited

U.S. PATENT DOCUMENTS

| | | | |
|---|---|---|---|
| 2023/0216626 A1* | 7/2023 | Muruganathan ...... | H04L 5/0035 |
| | | | 370/328 |
| 2023/0300851 A1* | 9/2023 | Zhou .................. | H04W 72/231 |
| | | | 370/329 |
| 2023/0328755 A1* | 10/2023 | Guo ................... | H04B 7/06968 |
| | | | 370/329 |
| 2023/0379071 A1* | 11/2023 | Yuan .................... | H04W 72/20 |

FOREIGN PATENT DOCUMENTS

| | | | |
|---|---|---|---|
| WO | 2018089662 A1 | 5/2018 | |
| WO | 2018119132 A1 | 6/2018 | |

OTHER PUBLICATIONS

3GPP TSG-RAN WG2 Meeting #118-e, R2-2206864 Title:Correctionon enhanced IIoT&URLLC support for NR (Year: 2022).*
International Searching Authority, "Written Opinion of the International Searching Authority," PCT/CN2021/071054, Jan. 11, 2021, pp. 1-3.
Samsung, "Status Report to TSG", 3GPP TSG RAN Meeting #90-e RP-202299, Dec. 7-11, 2020, pp. 1-15.

* cited by examiner

UE                                                    BS

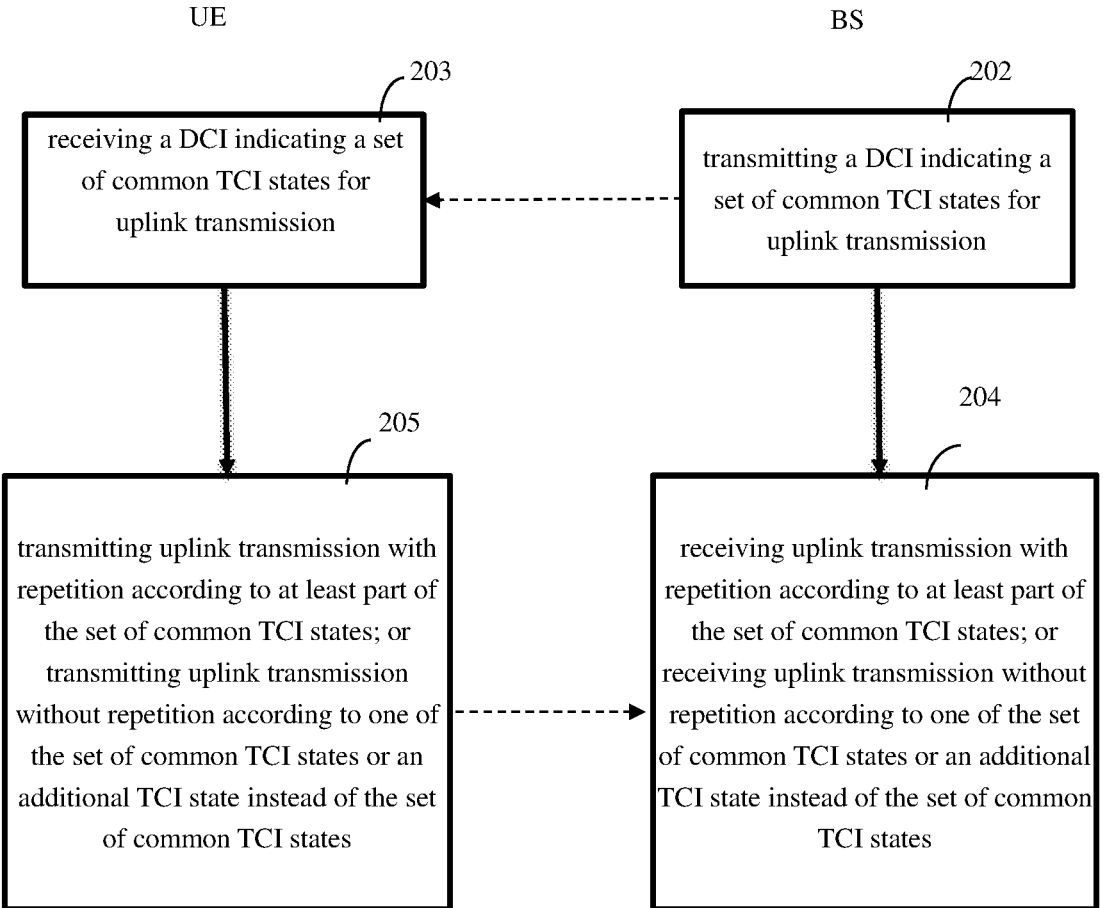

receiving a DCI indicating a set of common TCI states for uplink transmission — 203 transmitting a DCI indicating a set of common TCI states for uplink transmission — 202 transmitting uplink transmission with repetition according to at least part of the set of common TCI states; or transmitting uplink transmission without repetition according to one of the set of common TCI states or an additional TCI state instead of the set of common TCI states — 205 receiving uplink transmission with repetition according to at least part of the set of common TCI states; or receiving uplink transmission without repetition according to one of the set of common TCI states or an additional TCI state instead of the set of common TCI states — 204

FIG. 2

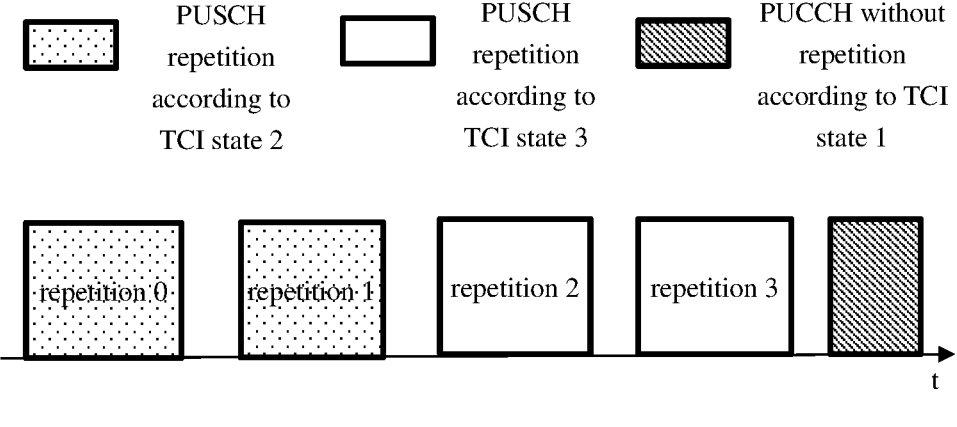
Case a
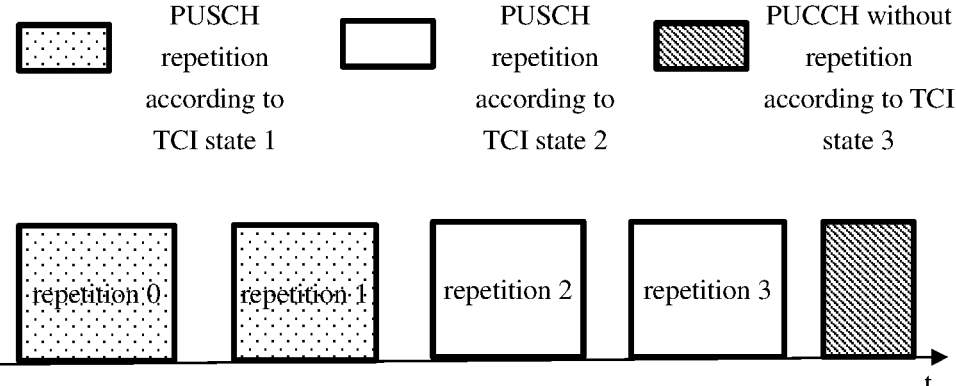
Case b
FIG. 5

METHOD AND APPARATUS FOR UPLINK TRANSMISSION

TECHNICAL FIELD

Embodiments of the present application generally relate to wireless communication technology, especially to a method and an apparatus for uplink transmission.

BACKGROUND

Regarding enhancements on multiple-input multiple-output (MIMO) for new radio (NR), a work item description (WID) approved in NR R17 includes enhancement on multi-beam operation, mainly targeting frequency range (FR)2 while also applicable to FR1. Wherein, a research topic is to identify and specify features to facilitate more efficient (lower latency and overhead) downlink/uplink (DL/UL) beam management to support higher intra-band and L1/L2-centric inter-cell mobility and/or a larger number of configured transmission configuration indication (TCI) states, including common beam for data and control transmission/reception for DL and UL, especially for intra-band carrier aggregation (CA).

In addition, it has been agreed that downlink control information (DCI) format 1_1 and DCI format 1_2 can be used for DL and UL joint common beam indication, and it has been proposed that DCI format 1_1 and DCI format 1_2 can be used for UL only common beam indication in RAN1 #103e. However, all the discussions in RAN1 are related to a single transmit-receive point (TRP), and common beam mechanism in multiple TRPs has not discussed yet. The industry needs to solve technical problems on common beam for UL transmission in multiple TRPs.

SUMMARY OF THE APPLICATION

One objective of the embodiments of the present application is to provide a technical solution for uplink transmission, e.g., determination of common beam for uplink transmission in view of multi-TRP/panel.

According to an embodiment of the present application, a method may include: receiving a DCI indicating a set of common TCI states for uplink transmission; and in response to the set of common TCI states being applicable for the uplink transmission, transmitting uplink transmission with repetition according to at least part of the set of common TCI states; or transmitting uplink transmission without repetition according to one of the set of common TCI states or an additional TCI state instead of the set of common TCI states.

In some embodiments of the present application, in the case that the set of common TCI states includes only one common TCI state, the uplink transmission with repetition and the uplink transmission without repetition are transmitted according to the only one common TCI state.

In some other embodiments of the present application, in the case that the set of common TCI state includes two common TCI states, the uplink transmission with repetition is transmitted according to the two common TCI states, each repetition being associated with a corresponding TCI state of the two common TCI states based on a beam mapping pattern. The uplink transmission without repetition may be transmitted according to one common TCI state of the two common TCI states, and the one common TCI state is a first common TCI state of the two common TCI states or a common TCI state with a lower index of the two common TCI states in some embodiments of the present application.

In some other embodiments of the present application, the uplink transmission without repetition may be transmitted according to the additional common TCI state, and the additional common TCI state is latest only one common TCI state indicated by a previous DCI.

In some yet other embodiments of the present application, in the case that the set of common TCI states includes three common TCI states, the uplink transmission with repetition is transmitted according to two common TCI states of the three common TCI states, each repetition being associated with a corresponding TCI state of the two common TCI states based on a beam mapping pattern. The uplink transmission without repetition is transmitted according to a remaining common TCI state of the three common TCI states except for the two common TCI states, wherein the remaining common TCI state is a first common TCI state of the three common TCI states or a last common TCI state of the three common TCI states.

According to another embodiment of the present application, a method includes: transmitting a DCI indicating a set of common TCI states for uplink transmission; and in response to the set of common TCI states being applicable for the uplink transmission, receiving uplink transmission with repetition according to at least part of the set of common TCI states; or receiving uplink transmission without repetition according to one of the set of common TCI states or an additional TCI state instead of the set of common TCI states.

In some embodiments of the present application, in the case that the set of common TCI states includes only one common TCI state, the uplink transmission with repetition and the uplink transmission without repetition are received according to the only one common TCI state.

In some other embodiments of the present application, in the case that the set of common TCI states includes two common TCI states, the uplink transmission with repetition is received according to the two common TCI states, each repetition being associated with a corresponding TCI state of the two common TCI states based on a beam mapping pattern. The uplink transmission without repetition may be received according to one common TCI state of the two common TCI states, wherein the one common TCI state is a first common TCI state of the two common TCI states or a common TCI state with a lower index of the two common TCI states in some embodiments of the present application. The uplink transmission without repetition may be received according to the additional common TCI state, and the additional common TCI state is latest only one common TCI state indicated by a previous DCI in some other embodiments of the present application.

In some yet other embodiments of the present application, in the case that the set of common TCI states includes three common TCI states, the uplink transmission with repetition is received according to two common TCI states of the three common TCI states, each repetition being associated with a corresponding TCI state of the two common TCI states based on a beam mapping pattern. The uplink transmission without repetition is received according to a remaining common TCI state of the three common TCI states except for the two common TCI states, wherein the remaining common TCI state is a first common TCI state of the three common TCI states or a last common TCI state of the three common TCI states.

Some embodiments of the present application also provide an apparatus, including: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for uplink transmission, especially for common beam determination for uplink transmission in view of multi-TRP/panel, and thus can facilitate and improve the implementation of 5G NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 2 is a flow chart illustrating a method for uplink transmission according to some embodiments of the present application;

FIG. 5 illustrates a schematic diagram of uplink transmission in case of three common beams being applicable for the uplink transmission according to some embodiments of the present application.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE) R8 and so on. Persons skilled in the art know very well that, with the development of network architecture and new service scenarios, the embodiments in the present application are also applicable to similar technical problems.

Figure 1:
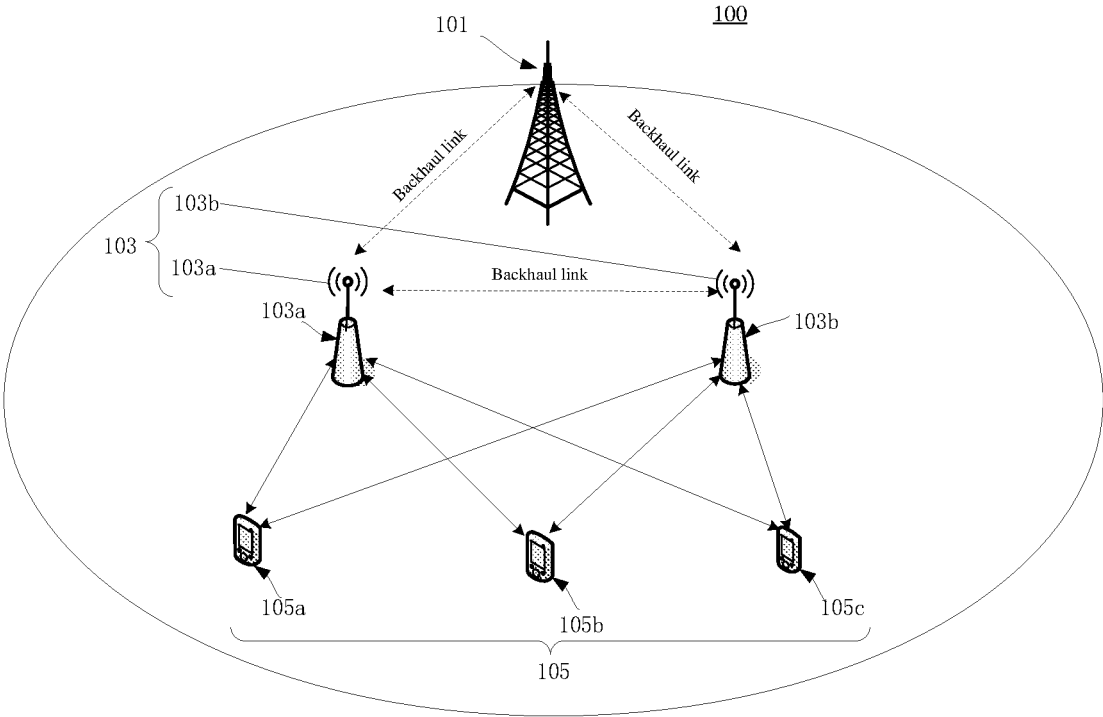
FIG. 1 is a schematic diagram illustrating an exemplary wireless communication system according to an embodiment of the present application.

FIG. 1 illustrates a schematic diagram of an exemplary wireless communication system 100 according to some embodiments of the present application.

Specifically, as shown in FIG. 1, the exemplary wireless communication system 100 includes one base station (BS) 101, two TRPs 103, e.g., a first TRP 103*a* and a second TRP 103*b*, and two user equipment (UEs) 105, e.g., a first UE 105*a* and a second UE 105*b*. Although only one BS 101, two TRPs 103 and two UEs 105 are shown for simplicity, it should be noted that the wireless communication system 100 may further include more BSs 101, TRPs 103, and UEs 105. The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may be distributed over a geographic region, and generally be a part of a radio access network (RAN) that may include one or more controllers communicably coupled to one or more corresponding BSs 101. In some embodiments of the present application, the BS 101 may also be referred to as an access point, an access terminal, a base, a macro cell, a Node-B, an evolved Node B (eNB), a gNB, a Home Node-B, a relay node, a device, or described using other terminology used in the art.

The TRPs 103, for example, the first TRP 103*a* and the second TRP 103*b* may be connected to the same or different BSs 101, for example using a backhaul. Each TRP 103 may act like a small base station, serving a number of UEs 105 under the control of the BS 101. In some application scenarios, for example, in a scenario of coordinated multi-point (CoMP), the TRP can even be a base station. As an example, both the first TRP 103*a* and the second TRP 103*b* may serve a number of mobile stations including the first UE 105*a* and the second UE 105*b* within a serving area, for example, a cell or a cell sector. The first TRP 103*a* and the second TRP 103*b* can also communicate with each other, for example via a backhaul. In different application scenarios, a TRP 103 may be described using different terminologies. For example, in multi-DCI based multiple TRPs, the CORE-SETPoolIndex value can be used to distinguish different TRPs 103; while in single-DCI based multiple TRPs, the failure detection resource index, the candidate resource set index or a new RRC configured index can be used to distinguish different TRPs 103. Persons skilled in the art should understand that as the 3GPP and the communication technology develop, the terminologies recited in the specification may change, which should not affect the scope of the present application.

The UE 105 may be or include a computing device, such as a desktop computer, a laptop computer, a personal digital assistant (PDA), a tablet computer, a smart television (e.g., a television connected to the Internet), a set-top box, a game console, a security system (including a security camera), a vehicle on-board computer, a network device (e.g., a router, a switch, or a modem), or the like. According to some other embodiments of the present application, the UE 105 may be or include a portable wireless communication device, a smart phone, a cellular telephone, a flip phone, a device having a subscriber identity module, a personal computer, a selective call receiver, or any other device that is capable of sending and receiving communication signals on a wireless network. In addition, the UE 105 may also be referred to as a subscriber unit, a mobile, a mobile station, a user, a terminal, a mobile terminal, a wireless terminal, a fixed terminal, a subscriber station, a user terminal, or a device, or described using other terminology used in the art. Different UEs 105, e.g., the first UE 105*a* and the second UE 105*b* may be with the same device type or different device types.

Multi-TRP/panel transmission has been introduced into NR since R16. Meanwhile, according to NR R17, to enhance MIMO for NR, common beam for data and control transmission/reception for DL and UL will be used, especially for intra-band CA. Herein (through the specification), the terminology "beam" can be represented by "TCI state" etc. Moreover, multiple beams, e.g., 2 beams can be indicated or configured for uplink transmission with repetition, e.g., physical uplink shared channel (PUSCH) with repetition or physical uplink control channel (PUCCH) with repetition, wherein each beam is associated with at least one repetition according a configured beam mapping pattern. However, only one beam can be used for uplink transmission without repetition considering the power limitation of UEs. Thus, when one or more common beams are indicated for uplink transmission, how to determine the common beam for uplink transmission with repetition and uplink transmission without repetition should be solved.

At least for solving the above technical problem, embodiments of the present application provide a technical solution for uplink transmission, especially for determination of common beam for uplink transmission.

FIG. 2 illustrates a flow chart of a method for uplink transmission according to some embodiments of the present application. Although the method is illustrated in a system level by a UE in a remote side (or UE side) and a BS in a network side (or BS side), persons skilled in the art can understand that the method implemented in the remote side and that implemented in the network side can be separately implemented and incorporated by other apparatus with the like functions.

In the exemplary method shown in FIG. 2, in step 202, the network side, e.g., a BS 101 as shown in FIG. 1 may transmit a DCI indicating a set of common TCI states for uplink transmission to the remote side, e.g., to a UE 105 as shown in FIG. 1. Accordingly, in the remote side, in step 203, the UE 105 receives the DCI indicating a set of common TCI states for uplink transmission. The set of common TCI states includes one or more common TCI states, e.g., 1, 2, 3, or even more common TCI states.

The uplink transmission may be PUSCH transmission or PUCCH transmission. On the other hand, the uplink transmission may be uplink transmission with repetition or uplink transmission without repetition. For example, when an uplink transmission is a PUSCH transmission, it may be a PUSCH transmission with or without repetition, e.g., being a PUSCH repetition type A or a PUSCH repetition type B. Different from PUSCH repetition type A, in PUSCH repetition type B, concepts "nominal repetition" and "actual repetition" are introduced so that multiple repetitions within one slot will be identified, which can refer to TS 38.214. PUSCH repetition Type A and PUSCH repetition Type B can be dynamically indicated with different repetition numbers, wherein the repetition number can even be one. For the PUCCH transmission, the repetition number can be radio resource control (RRC) configured per PUCCH format for long PUCCH formats, e.g., PUCCH format 1, 3 or 4. However, herein (through the specification), the uplink transmission with repetition means the uplink transmission with the repetition number larger than one. The uplink transmission with only one repetition, i.e., the repetition number being one, is regarded as the uplink transmission without repetition.

In step 205, in response to the set of common TCI states being applicable for the uplink transmission, the UE may transmit uplink transmission with repetition according to at least part of the set of common TCI states; or transmit uplink transmission without repetition according to one of the set of common TCI states or an additional TCI state instead of the set of common TCI states. Accordingly, in the network side, in step 204, the uplink transmission can be received, e.g., by the BS 101 according to the corresponding common TCI state(s). For example, in response to the set of common TCI states being applicable for the uplink transmission, the BS 101 receives the uplink transmission with repetition according to at least part of the set of common TCI states; or receives the uplink transmission without repetition according to one of the set of common TCI states or an additional TCI state instead of the set of common TCI states.

When more than one common TCI state is applicable for uplink transmission with repetition, each repetition is associated with a corresponding TCI state of the more than one common TCI state based on a beam mapping pattern. The beam mapping pattern can be any beam mapping pattern, e.g., a cyclical mapping pattern, or a sequential mapping pattern, which have been agreed by 3GPP. For example, for two TCI state, e.g., TCI state #1, and TCI state #2, when the cyclical mapping pattern is enabled, the first and second TCI state are applied to the first and second transmit units, respectively, and the same mapping pattern continues to the remaining transmit units. Accordingly, the cyclical mapping pattern might be #1 #2 #1 #2 #1 #2 #1 #2 . . . . When the sequential mapping pattern is enabled, the first TCI state is applied to the first and second transmit units, and the second TCI state is applied to the third and fourth transmit units, and the same TCI mapping pattern continues to the remaining transmit units. Accordingly, the sequential mapping pattern might be #1 #1 #2 #2 #1 #1 #2 #2 . . . .

Based on the above basic solution, considering different numbers of common beams applicable for uplink transmission, some exemplary schemes are further illustrated according to embodiments of the present application below.

Scheme 1: the set of common TCI states for uplink transmission includes only one common TCI state, and the uplink transmission, i.e., uplink transmission with repetition, or uplink transmission without repletion is transmitted according to the set of common TCI states.

Considering that only one beam can be used for uplink transmission simultaneously due to the UE power limitation, the only one common beam can be used for one of PUSCH transmission and PUCCH transmission in a time interval. According to some embodiments of the present application, in the case that the set of common TCI states includes only one common TCI state, all the uplink transmissions, e.g., the uplink transmission with repetition and the uplink transmission without repetition are transmitted according to the only one common TCI state in the remote side. Accordingly, the uplink transmission with repetition and the uplink transmission without repetition are received according to the only one common TCI state in the network side. That is, when only one common beam is indicated for uplink transmission, the common beam is applicable for all uplink transmissions with repetition or without repetition, e.g., the PUSCH transmission with or without repetition, and the PUCCH transmission with or without repetition.

Figure 3:
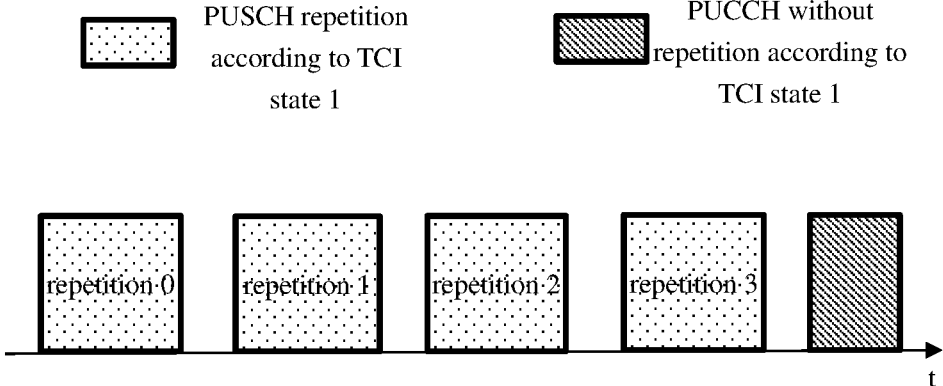
FIG. 3 illustrates a schematic diagram of uplink transmission in case of only one common beam being applicable for the uplink transmission according to some embodiments of the present application.

FIG. 3 illustrates a schematic diagram of uplink transmission in case of only one common beam being applicable for the uplink transmission according to some embodiments of the present application. As shown in FIG. 3, it is assumed that only one beam, e.g., TCI state 1 is configured for uplink transmission. After the only one common beam is applicable, a PUSCH repetition Type A is scheduled by a DCI with the repetition number of 4 and a sequential mapping pattern is configured for PUSCH repetition. A PUCCH with format 2 is also configured for transmission without repetition later. Then, according to the above illustrated method in Scheme 1, all the 4 repetitions of the PUSCH repetition Type A, i.e., repetition 0, repetition 1, repetition 2 and repetition 3 and the PUCCH with format 2 are transmitted according to TCI state 1.

Scheme 2: the set of common TCI states for uplink transmission includes two common TCI states, uplink transmission with repetition is transmitted or received according to the set of common TCI states, and uplink transmission without repetition is transmitted or received according to one of the set of common TCI states or an additional TCI state instead of the set of common TCI states.

For example, in single DCI based multiple TRPs, uplink transmission with repetition, e.g., PUSCH transmission with repetition and PUCCH transmission with repetition can be indicated or configured with two common beams, wherein each repetition is associated with one beam of the two common beams according to a beam mapping pattern. The beam mapping pattern may be any mapping pattern, e.g., a cyclical mapping pattern, or a sequential mapping pattern. According to some embodiments of the present application, in the case that the set of common TCI state includes two common TCI states, the uplink transmission with repetition is transmitted according to the two common TCI states in the remote side, and is received according to the two common TCI states in the network side, wherein, each repetition is associated with a corresponding TCI state of the two common TCI states based on a beam mapping pattern.

Figure 4:
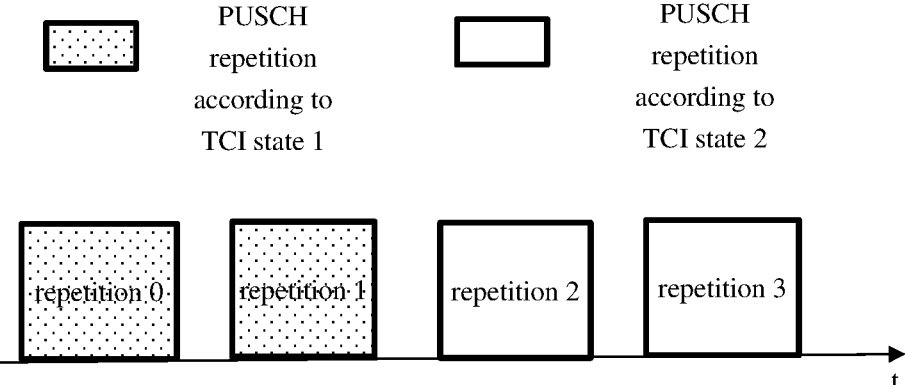
FIG. 4 illustrates a schematic diagram of uplink transmission in case of two common beams being applicable for the uplink transmission according to some embodiments of the present application.

FIG. 4 illustrates a schematic diagram of uplink transmission in case of two common beams being applicable for the uplink transmission according to some embodiments of the present application. Referring to FIG. 4, it is assumed that two common beams, e.g., TCI state 1 and TCI state 2 are indicated for uplink transmission. After the two common beams are applicable, a PUSCH repetition Type A is scheduled by a DCI with a repetition number of 4 and a sequential mapping pattern is configured for PUSCH repetition. Then, according to the above illustrated method in Scheme 2, the first repetition, i.e., repetition 0 and the second repetition, i.e., repetition 1 of the PUSCH repetition Type A are transmitted according to TCI state 1; while the third repetition, i.e., repetition 2 and the fourth repetition, i.e., repetition 3 of the PUSCH repetition Type A are transmitted according to TCI state 2.

For uplink transmission without repetition, since it can only be transmitted by one beam, only one applicable beam should be determined even though two common beams are indicated for uplink transmission in Scheme 2.

According to some embodiments of the present application, the uplink transmission without repetition is transmitted according to one common TCI state of the two common TCI states in the remote side and is received according to the one common TCI state of the two common TCI states in the network side. The one common TCI state for uplink transmission without repetition can be determined from the two common TCI states in various manners.

For example, in some embodiments of the present application, the one common TCI state is the first common TCI state of the two common TCI states. The first common TCI state of the two common TCI states can be determined in various manners, e.g., in a manner similar to that for UE-specific physical downlink shared channel (PDSCH) medium access control (MAC) control element (CE) specified in TS 38. 321 (see Section 6.1.3.24 Enhanced TCI States Activation/Deactivation for UE-specific PDSCH MAC CE). In this manner, the first common TCI state is the first TCI state activated or deactivated for uplink transmission of a TCI codepoint including two TCI states. For example, it is assumed that two common beams, e.g., TCI state 1 and TCI state 2 are indicated for uplink transmission, wherein TCI state 1 is the first beam of the two common beams. After the two common beams are applicable, a PUSCH repetition Type A is scheduled with repetition number of 1. Then, the PUSCH repetition Type A is transmitted according to TCI state 1.

In some other embodiments of the present application, the one common TCI state for uplink transmission without repetition is a common TCI state with a lower index of the two common TCI states. For example, it is assumed that two common beams, e.g., TCI state 2 and TCI state 4 are indicated for uplink transmission. After the two common beams are applicable, a PUCCH with format 2 is configured for transmission without repetition. Since TCI state 2 is the common beam with the lower index of the two common beams, the PUCCH with format 2 is transmitted according to TCI state 2.

According to some other embodiments of the present application, the uplink transmission without repetition is transmitted or received according to an additional common TCI state other than the two indicated common beams. For example, the additional common TCI state is the latest only one common TCI state indicated by a previous DCI or another TCI state.

In an exemplary scenario, before the two common beams are indicated for uplink transmission by a DCI, only one common beam is indicated for uplink transmission by a previous DCI. Since only one beam can be applied for uplink transmission without repetition, the latest only one common beam indicated by the previous DCI can still be used for the uplink transmission without repetition regardless the common beam configuration being updated from one common beam to two common beams. That is, the updated two common beams will only be applied for uplink transmission with repetition, but will not impact the uplink transmission without repetitions. For example, it is assumed that only one common beam, e.g., TCI state 1 is indicated for uplink transmission firstly, and then two common beams, e.g., TCI state 2 and TCI state 3 are updated for uplink transmission. However, the updated common beam configuration does not impact the uplink transmission without repetition. After the two common beams are applicable, if a PUCCH transmission without repetition is dynamically scheduled by a DCI for hybrid automatic repeat request-acknowledge (HARQ-ACK) feedback, the PUCCH transmission without repetition will be transmitted still according to TCI state 1.

Scheme 3: the set of common TCI states includes three common TCI states, one common TCI state of three common TCI states is applied for uplink transmission without repetition and the other two common TCI states of three common TCI states are applied for uplink transmission with repetition.

According to some embodiments of the present application, the uplink transmission with repetition is transmitted according to two common TCI states of the three common TCI states in the remote side and is received according to the two common TCI states of the three common TCI states in the network side, wherein each repetition is associated with a corresponding TCI state of the two common TCI states based on a beam mapping pattern. The uplink transmission without repetition is transmitted in the remote side and received in the network side according to the remaining common TCI state of the three common TCI states except for the two common TCI states. That is, the uplink transmission with repetition is transmitted or received according to a part of the set of common TCI states indicated by the DCI, while the uplink transmission without repetition is transmitted or received according to the remaining one of the set of common TCI states. The common TCI state for uplink transmission without repetition and those for uplink transmission with repetition can be combined in various manners. For example, the first common TCI state of the three common TCI states is for uplink transmission without repetition, and the other two of the three common TCI states are for uplink transmission with repetition. In another example, the last common TCI state of the three common TCI states is for uplink transmission without repetition, and the other two of the three common TCI states are for uplink transmission with repetition.

The first or last common TCI state of the three common TCI states can be determined in various manners, e.g., in a manner similar to that for UE-specific PDSCH MAC CE specified in TS 38. 321 (see Section 6.1.3.24 Enhanced TCI States Activation/Deactivation for UE-specific PDSCH MAC CE) as stated above. In this manner, the first or last common TCI state is the first or last TCI state activated or deactivated for uplink transmission of a TCI codepoint including three TCI states.

FIG. 5 illustrates a schematic diagram of uplink transmission in case of three common beams being applicable for the uplink transmission according to some embodiments of the present application.

Referring to FIG. 5, it is assumed that three common TCI states, e.g., TCI state 1, TCI state 2 and TCI state 3 are configured for uplink transmission, wherein the first common TCI state is TCI state 1 and the last TCI state is TCI state 3. Meanwhile, a sequential mapping pattern is configured for PUSCH repetition. After the three common beams are applicable, a PUSCH repetition Type A is scheduled by a DCI with a repetition number of 4 firstly, and a PUCCH with format 2 is configured for transmission without repetition later.

According to the above illustrated method in Scheme 3, in the case that the first TCI state should be configured for uplink transmission without repetition, TCI state 1 will be applied for uplink transmission without repetition (Case a), while TCI state 2 and TCI state 3 will be applied for uplink transmission with repetition according to the configured beam mapping pattern. Then, for the uplink transmission with repetition, the first repetition, i.e., repetition 0 and the second repetition, i.e., repetition 1 of the PUSCH repetition Type A are transmitted according to TCI state 2; while the third repetition, i.e., repetition 2 and the fourth repetition, i.e., repetition 3 of the PUSCH repetition Type A are transmitted according to TCI state 3. For the uplink transmission without repetition, it will be transmitted according to TCI state 1.

Similarly, in the case that the last TCI state is configured for uplink transmission without repetition (Case b), TCI state 3 will be applied for uplink transmission without repetition, while TCI state 1 and TCI state 2 will be applied for uplink transmission with repetition according to the configured beam mapping pattern. Then, for the uplink transmission with repetition, the first repetition, i.e., repetition 0 and the second repetition, i.e., repetition 1 of the PUSCH repetition Type A are transmitted according to TCI state 1; while the third repetition, i.e., repetition 2 and the fourth repetition, i.e., repetition 3 of the PUSCH repetition Type A are transmitted according to TCI state 2. For the uplink transmission without repetition, it will be transmitted according to TCI state 3.

Although the above embodiments only illustrate the set of common beams (TCI states) includes 1, 2, or 3 beams, persons skilled in the art should well know the technical solutions based on other common beam numbers based on the above disclosure and teaching.

In addition, embodiments of the present application also propose an apparatus for uplink transmission. For example, FIG. 6 illustrates a block diagram of an apparatus 600 for uplink transmission according to some embodiments of the present application.

Figure 6:
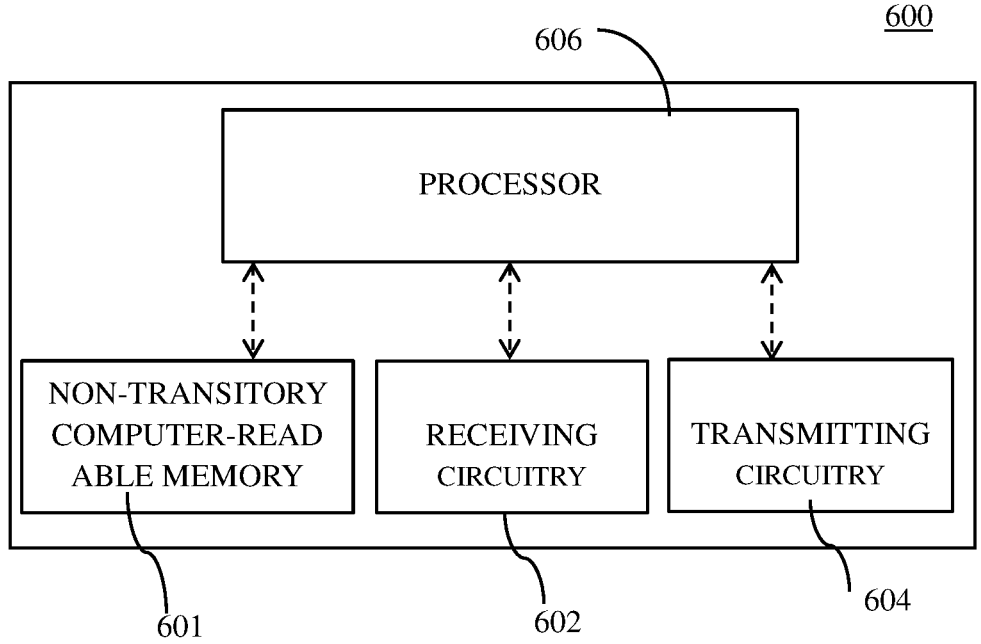
FIG. 6 illustrates a block diagram of an apparatus for uplink transmission according to some embodiments of the present application.

As shown in FIG. 6, the apparatus 600 may include at least one non-transitory computer-readable medium 601, at least one receiving circuitry 602, at least one transmitting circuitry 604, and at least one processor 606 coupled to the non-transitory computer-readable medium 601, the receiving circuitry 602 and the transmitting circuitry 604. The apparatus 600 may be a network side apparatus (e.g., a BS) configured to perform a method illustrated in FIG. 2 and the like, or a remote unit (e.g., a UE) configured to perform a method illustrated in FIG. 2 or the like.

Although in this figure, elements such as the at least one processor 606, transmitting circuitry 604, and receiving circuitry 602 are described in the singular, the plural is contemplated unless a limitation to the singular is explicitly stated. In some embodiments of the present application, the receiving circuitry 602 and the transmitting circuitry 604 can be combined into a single device, such as a transceiver. In certain embodiments of the present application, the apparatus 600 may further include an input device, a memory, and/or other components.

For example, in some embodiments of the present application, the non-transitory computer-readable medium 601 may have stored thereon computer-executable instructions to cause a processor to implement the method with respect to the UE as described above. For example, the computer-executable instructions, when executed, cause the processor 606 interacting with receiving circuitry 602 and transmitting circuitry 604, so as to perform the steps with respect to the UE depicted in FIG. 2.

In some embodiments of the present application, the non-transitory computer-readable medium 601 may have stored thereon computer-executable instructions to cause a processor to implement the method with respect to the BS as described above. For example, the computer-executable instructions, when executed, cause the processor 606 interacting with receiving circuitry 602 and transmitting circuitry 604, so as to perform the steps with respect to the BS depicted in FIG. 2.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flow-charts shown in the figures may be used to implement the processor functions of this application. For example, an embodiment of the present application provides an apparatus including a processor and a memory. Computer program-mable instructions for implementing a method stored in the memory, and the processor is configured to perform the computer programmable instructions to implement the method. The method may be a method as stated above or other method according to an embodiment of the present application.

An alternative embodiment preferably implements the methods according to embodiments of the present applica-tion in a non-transitory, computer-readable storage medium storing computer programmable instructions. The instruc-tions are preferably executed by computer-executable com-ponents preferably integrated with a network security sys-tem. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hard-ware device. For example, an embodiment of the present application provides a non-transitory, computer-readable storage medium having computer programmable instruc-tions stored therein. The computer programmable instruc-tions are configured to implement a method as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodi-ments of the application as set forth herein are intended to be illustrative, not limiting. Various changes may be made without departing from the spirit and scope of the applica-tion.

What is claimed:

1. A method performed by a user equipment (UE), the method comprising:
receiving a downlink control information (DCI) indicat-ing a set of common transmission configuration indi-cation (TCI) states for uplink transmission; and
in response to the set of common TCI states being applicable for the uplink transmission,
transmitting uplink transmission with repetition according to at least part of the set of common TCI states, if the set of common TCI state includes two common TCI states, the uplink transmission with repetition is trans-mitted according to the two common TCI states, each repetition being associated with a corresponding TCI state of the two common TCI states based on a beam mapping pattern and whether physical uplink shared channel (PUSCH) repetition type A or PUSCH repeti-tion type B is used.

2. The method of claim 1, wherein, if the set of common TCI states includes only one common TCI state, the uplink transmission with repetition and the uplink transmission without repetition are transmitted according to the only one common TCI state.

3. The method of claim 1, wherein the uplink transmission without repetition is transmitted according to one common TCI state of the two common TCI states, and the one common TCI state is a first common TCI state of the two common TCI states or a common TCI state with a lower index of the two common TCI states.

4. The method of claim 1, wherein the uplink transmission without repetition is transmitted according to an additional common TCI state, and the additional common TCI state is latest only one common TCI state indicated by a previous DCI.

5. The method of claim 1, wherein, if the set of common TCI states includes three common TCI states, the uplink transmission with repetition is transmitted according to two common TCI states of the three common TCI states, each repetition being associated with a corresponding TCI state of the two common TCI states based on a beam mapping pattern.

6. The method of claim 5, wherein the uplink transmission without repetition is transmitted according to a remaining common TCI state of the three common TCI states except for the two common TCI states, wherein the remaining common TCI state is a first common TCI state of the three common TCI states or a last common TCI state of the three common TCI states.

7. A base station, comprising:
at least one memory; and
at least one processor coupled with the at least one memory and configured to cause the base station to:
transmit a downlink control information (DCI) indicat-ing a set of common transmission configuration indication (TCI) states for uplink transmission; and
in response to the set of common TCI states being applicable for the uplink transmission,
receive uplink transmission with repetition according to at least part of the set of common TCI states, wherein, if the set of common TCI state includes two common TCI states, the uplink transmission with repetition is received according to the two common TCI states, each repetition being associated with a corresponding TCI state of the two common TCI states based on a beam mapping pattern and whether physical uplink shared channel (PUSCH) repetition type A or PUSCH repetition type B is used.

8. The base station of claim 7, wherein, if the set of common TCI states includes only one common TCI state, the uplink transmission with repetition and the uplink trans-mission without repetition are received according to the only one common TCI state.

9. The base station of claim 7, wherein, the uplink transmission without repetition is received according to one common TCI state of the two common TCI states, wherein the one common TCI state is a first common TCI state of the two common TCI states or a common TCI state with a lower index of the two common TCI states.

10. The base station of claim 7, wherein, the uplink transmission without repetition is received according to an additional common TCI state, and the additional common TCI state is latest only one common TCI state indicated by a previous DCI.

11. The base station of claim 7, wherein, if the set of common TCI states includes three common TCI states, the uplink transmission with repetition is received according to two common TCI states of the three common TCI states, each repetition being associated with a corresponding TCI state of the two common TCI states based on a beam mapping pattern.

12. The base station of claim 11, wherein, the uplink transmission without repetition is received according to a remaining common TCI state of the three common TCI states except for the two common TCI states, wherein the remaining common TCI state is a first common TCI state of the three common TCI states or a last common TCI state of the three common TCI states.

13. A user equipment (UE), comprising:

at least one memory; and at least one processor coupled with the at least one memory and configured to cause the UE to:

receive a downlink control information (DCI) indicating a set of common transmission configuration indication (TCI) states for uplink transmission; and in response to the set of common TCI states being applicable for the uplink transmission, transmit uplink transmission with repetition according to at least part of the set of common TCI states, wherein, if the set of common TCI state includes two common TCI states, the uplink transmission with repetition is transmitted according to the two common TCI states, each repetition being associated with a corresponding TCI state of the two common TCI states based on a beam mapping pattern and whether physical uplink shared channel (PUSCH) repetition type A or PUSCH repetition type B is used.

14. The UE of claim 13, wherein, if the set of common TCI states includes only one common TCI state, the uplink transmission with repetition and the uplink transmission without repetition are transmitted according to the only one common TCI state.

15. The UE of claim 13, wherein the uplink transmission without repetition is transmitted according to one common TCI state of the two common TCI states, and the one common TCI state is a first common TCI state of the two common TCI states or a common TCI state with a lower index of the two common TCI states.

16. The UE of claim 13, wherein the uplink transmission without repetition is transmitted according to an additional common TCI state, and the additional common TCI state is latest only one common TCI state indicated by a previous DCI.

17. A processor for wireless communication, comprising:

at least one controller coupled with at least one memory and configured to cause the processor to:

receive a downlink control information (DCI) indicating a set of common transmission configuration indication (TCI) states for uplink transmission; and in response to the set of common TCI states being applicable for the uplink transmission, transmit uplink transmission with repetition according to at least part of the set of common TCI states, wherein, if the set of common TCI state includes two common TCI states, the uplink transmission with repetition is transmitted according to the two common TCI states, each repetition being associated with a corresponding TCI state of the two common TCI states based on a beam mapping pattern and whether physical uplink shared channel (PUSCH) repetition type A or PUSCH repetition type B is used.

* * * * *